US011350355B2

(12) United States Patent
Wang et al.

(10) Patent No.: US 11,350,355 B2
(45) Date of Patent: May 31, 2022

(54) SELECTING AND MANAGING NETWORK SLICES (71) Applicant: Nokia Solutions and Networks Oy, Espoo (FI)

(72) Inventors: Zhi Wang, Shandong (CN); Yigang Cai, Naperville, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 17/049,629

(22) PCT Filed: May 3, 2018

(86) PCT No.: PCT/CN2018/085407
§ 371 (c)(1),
(2) Date: Oct. 22, 2020

(87) PCT Pub. No.: WO2019/210476
PCT Pub. Date: Nov. 7, 2019

(65) Prior Publication Data
US 2021/0243684 A1 Aug. 5, 2021

(51) Int. Cl.
*H04W 48/18* (2009.01)
*H04M 15/00* (2006.01)
(Continued)

(52) U.S. Cl.
CPC ........... *H04W 48/18* (2013.01); *H04M 15/66* (2013.01); *H04W 4/24* (2013.01); *H04W 48/16* (2013.01)

(58) Field of Classification Search
CPC ....... H04W 48/18; H04W 4/24; H04W 48/16; H04M 15/66; H04M 15/8083; H04M 15/8055; H04M 15/805; H04L 12/1407
See application file for complete search history.

(56) References Cited

U.S. PATENT DOCUMENTS 9,961,624 B1  5/2018 Zait ........................... 455/435.2
11,082,244 B2* 8/2021 McNamee ............ H04M 15/00
(Continued)

FOREIGN PATENT DOCUMENTS

CN  107889255 A  4/2018
CN  107925620 A  4/2018
(Continued)

OTHER PUBLICATIONS

"3$^{rd}$ Generation Partnership Project; Technical Specification Group Services and System Aspects; Study on Architecture for Next Generation System (Release 14)", 3GPP TR 23.799, V14.0.0, Dec. 16, 2016, 522 pages.
(Continued)

*Primary Examiner* — Julio R Perez
(74) *Attorney, Agent, or Firm* — Harrington & Smith (57) ABSTRACT

Aspects described herein relate to various methods, systems and apparatuses that can be used to configure and manage a network slice based on billing rate information. By selecting a network slice based on billing rate information, the system may further be able to respond to billing rate changes by reselecting network slices. For example, changes in the usage of the network slice or the usage of the overall network infrastructure may cause a change to a billing rate associated with the network slice. These aspects, and others described herein, may result in improved network performance by, for example, offloading extra usage from an overloaded network slice to a network slice that is currently less used.

13 Claims, 6 Drawing Sheets

(51) Int. Cl.
*H04W 4/24* (2018.01)
*H04W 48/16* (2009.01)

(56) References Cited

U.S. PATENT DOCUMENTS

| | | | |
|---|---|---|---|
| 2016/0352924 A1 | 12/2016 | Senarath et al. | 15/81 |
| 2016/0353268 A1* | 12/2016 | Senarath | H04L 41/5051 |
| 2016/0353924 A1 | 12/2016 | Montoya et al. | 37/6 |
| 2018/0077023 A1* | 3/2018 | Zhang | H04L 41/0803 |
| 2018/0077024 A1* | 3/2018 | Zhang | H04L 63/0272 |
| 2018/0220358 A1* | 8/2018 | Reith | H04W 48/02 |
| 2019/0075552 A1* | 3/2019 | Yu | H04W 72/04 |
| 2019/0289444 A1 | 9/2019 | Senarath | H04M 15/80 |
| 2019/0327102 A1* | 10/2019 | Ashwood-Smith | G06Q 20/065 |
| 2020/0214054 A1* | 7/2020 | Qiao | H04W 48/18 |

FOREIGN PATENT DOCUMENTS

| | | |
|---|---|---|
| EP | 3 257 320 | 12/2016 |
| EP | 3 295 323 | 12/2016 |
| WO | WO 2017/173051 A1 | 10/2017 |

OTHER PUBLICATIONS

"3rd Generation Partnership Project; Technical Specification Group Services and System Aspects; System Architecture for the 5G System; Stage 2 (Release 15)", 3GPP TS 23.501 V15.0.0, Dec. 2017, 181 pages.

"3rd Generation Partnership Project; Technical Specification Group Services and System Aspects; Policy and Charging Control Framework for the 5 G System; Stage 2 (Release 15)", 3GPP TS 23.503 V15.0.0 , Dec. 2017, 56 pages.

"3rd Generation Partnership Project; Technical Specification Group Services and System Aspects; Telecommunication management; Charging management; Charging architecture and principles (Release 14)", 3 GPP TS 32.240 V14.4.0, Jun. 2017, 56 pages.

"3rd Generation Partnership Project; Technical Specification Group Services and System Aspects; Telecommunication management; Charging management; Study on charging aspects of 5G system architecture phase 1 (Release 15)", 3GPP TR 32.899 V2.0.0, Dec. 2017, 105 pages.

Chan, Ah Lot, et al., "QoS Negotiations and Real-Time Renegotiations for Multimedia Communications", IEEE, Dec. 26, 2021, 4 pages.

* cited by examiner

SELECTING AND MANAGING NETWORK SLICES

CROSS REFERENCE TO RELATED APPLICATION

This patent application is a U.S. National Stage application of International Patent Application Number PCT/CN2018/085407 filed May 3, 2018, which is hereby incorporated by reference in its entirety.

BACKGROUND

One or more network slices may be created over a network infrastructure and may be built using virtual resources. Each of the network slices may be configured to execute certain data processing tasks. Based on a request from a user device, a network slice may be selected and associated with a protocol data unit (PDU) session for the user device. During operation of the network slice, data for the PDU session may be processed and/or transmitted to the user device via the network slice. Usage of a network slice and the overall network may change over time. Based on the change in usage, an operator may find it desirable to manage how network slices are configured, selected and/or operated. Existing systems and methods for selecting and managing a network slice have failed to satisfy all the needs of an operator in configuring, selecting and/or operating network slices.

BRIEF SUMMARY

This summary is provided to introduce a selection of concepts in a simplified form that are further described below in the Detailed Description. This Summary is not intended to identify key features or essential features of the various embodiments, nor is it intended to be used to limit the scope of the claims.

Aspects described herein relate to various methods, systems and apparatuses that can be used to configure and manage a network slice based on billing rate information. By selecting a network slice based on billing rate information, the system may further be able to respond to billing rate changes by reselecting network slices. For example, changes in the usage of the network slice or the usage of the overall network infrastructure may cause a change to a billing rate associated with the network slice. These aspects, and others described herein, may result in improved network performance by, for example, offloading extra usage from an overloaded network slice to a network slice that is currently less used. These benefits, and others, will be apparent based on the below discussion.

In some variations, one or more computing devices may receive, from a user device, a protocol data unit (PDU) session request. The one or more computing devices may also receive, for a first network slice from available network slices, one or more selection criteria that is based on billing rate information associated with the first network slice. The one or more computing devices may select, based on the one or more selection criteria, the first network slice. The one or more computing devices may cause a PDU session to be established for the user device. The PDU session may be associated with the first network slice.

Additionally, in some variations, one or more computing devices may determine a billing rate rule for the first network slice. The billing rate rule may associate one or more network conditions with a billing rate. The one or more computing devices may determine, based on comparing one or more current network conditions to the one or more network conditions, that the billing rate rule is satisfied. The one or more computing devices may, based on the billing rate rule being satisfied, cause usage of the first network slice to be billed according to the billing rate.

BRIEF DESCRIPTION OF THE DRAWINGS

Some example embodiments are illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which are shown by way of illustration various embodiments in which the invention may be practiced. It is to be understood that other embodiments may be utilized and structural and functional modifications may be made without departing from the scope of the present invention.

Network slicing allows for multiple logical networks to be created on top of a common shared physical infrastructure of computing resources. In some variations, network slicing may allow for varying degrees of specialization that improves network performance. For example, some user devices may require a PDU session that requires low latency but allows for low throughput. One example of such a PDU session may be for communications between autonomous cars. Some other user devices may require a high throughput but allow for latency. One example of such a PDU session may be for an audio/video streaming service. By using network slicing, PDU sessions that have disparate requirements can be serviced over the same physical infrastructure.

There are, however, complexities involved in designing a system for selecting and managing network slices. For example, a PDU session may be established and associated with a network slice that operates over a radio access network (RAN). During operation of the network slice and in connection with the PDU session, data may be processed and routed to a user device. During the lifetime of the PDU session, the usage of the network slice or the usage of the overall RAN infrastructure may change. These changes may cause, for example, a change to a billing rate associated with the network slice. The user experience can be improved by attempting to avoid, or reduce, billing rate increases if other network slices that satisfy the PDU session requirements are available and billing at a lower rate. Thus, some aspects described herein relate to responding to billing rate changes by reselecting network slices during the lifetime of the PDU session. Additional aspects described herein relate to the determination of selection criteria based on billing rate information. These aspects, and others described herein, may result in improved network performance by, for example, offloading extra usage from an overloaded network slice (e.g., a slice with a now increased billing rate) to a network slice that is currently less used (e.g., a slice with a lower billing rate). These benefits, and others, will be apparent based on the below discussion.

Figure 1:
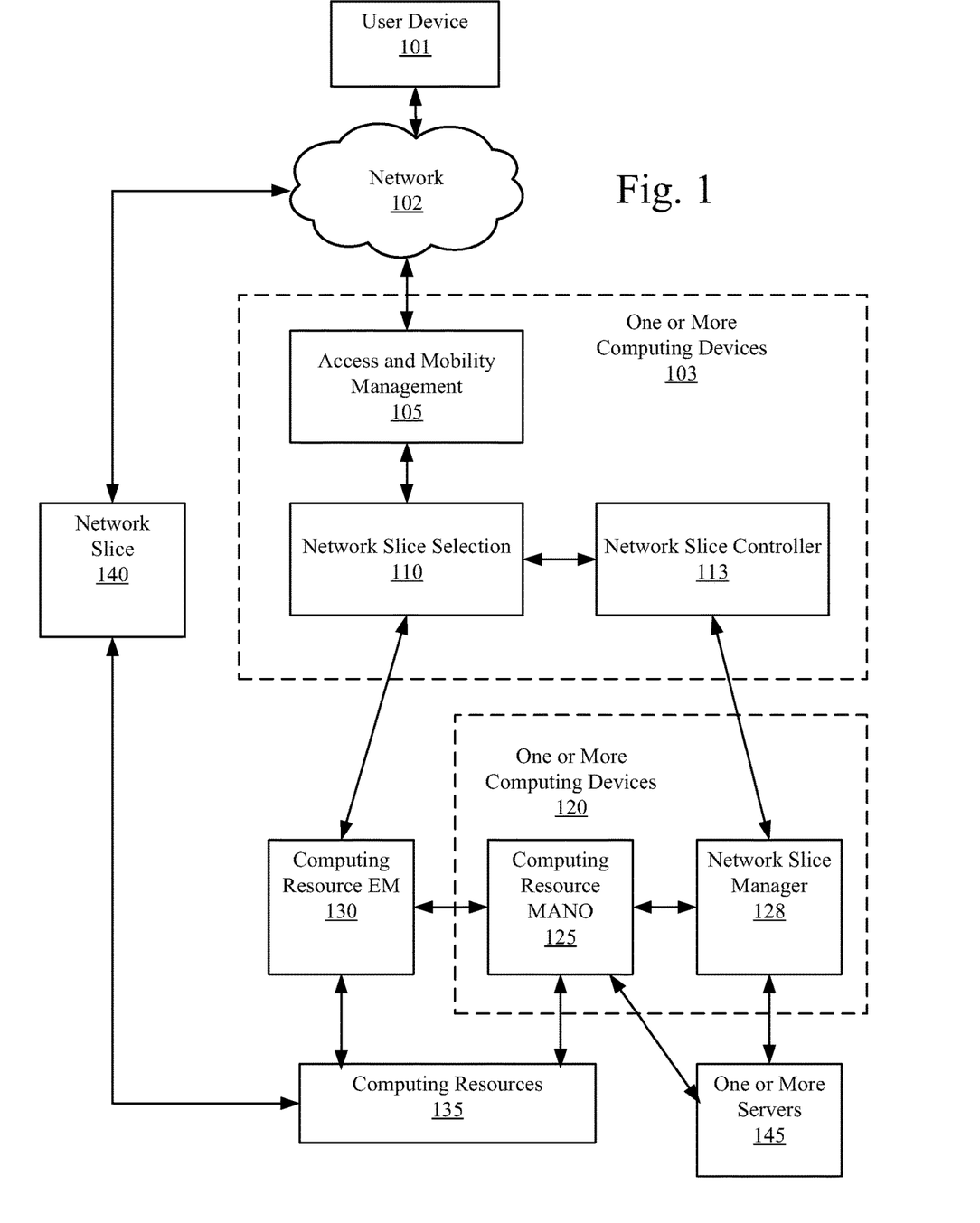
FIG. 1 shows an example block diagram of a system for configuring a network slice.

FIG. 1 shows an example block diagram of a system for configuring a network slice. As shown in FIG. 2, user device 101 may use various network services by transmitting and receiving data via network 102. The user device 101 may be user equipment, a station capable of communicating via a RAN, or some other device that uses a network service. Other examples of user devices include computing devices of autonomous cars or internet of things (IoT) devices. The user device 101 may be associated with an end-user (e.g., a personal computer or personal cell phone may be being used by a person) or may be associated with an enterprise (e.g., a server or other computing device of an industrial site, corporation, or other enterprise). The end user and/or the enterprise may have a business relationship with a service provider that operates network 102.

The user device 101 may transmit a request that causes a PDU session to be established for the user device 101. For example, the user device 101 may transmit, to the access and mobility management function (AMF) 105, a PDU session request or a registration request. The PDU session request or registration request may include information indicating one or more requirements of the PDU session. For example, the information may indicate that the PDU session is suitable for handling 5G enhanced mobile broadband, is suitable for low latency communications, or is for massive IoT communications. This information may be transmitted from the AMF 105 to the network slice selection function (NSSF) 110. Based on this information and selection criteria accessed by the network slice controller 113, a network slice 140 may be selected to perform one or more computing functions for the PDU session. In some variations, the network slice controller 113 may be a network slice control function (NSCF).

The network slice 140 may be configured to use one or more computing resources from computing resources 135. The computing resources 135 may include virtual computing resources and physical computing resources (e.g., a computing device). As some examples, the computing resources 135 may include one or more of the following: a virtual machine; a container; a microservice, a blade server, or the like. Only one network slice is depicted in FIG. 1 for simplicity, as there are commonly a pool of available network slices. Further, the pool of available network slices may change over time depending on the physical infrastructure that is currently operational and/or depending on what services are currently available via the network 102.

The NSSF 110 may be configured to communicate with the network slice controller 113. The network slice controller 113 may be configured to access selection criteria that was determined based on billing rate information. Based on the selection criteria, the network slice controller 113 may select a network slice for the PDU session or otherwise cause the NSSF 110 to select a network slice (e.g., network slice 140) for the PDU session. For example, the network slice controller 113 may receive, from the NSSF 110, an indication of one or more available network slices that satisfy the requirements of the PDU session. The network slice controller 113 may access the selection criteria and determine which network slice to select from the one or more available network slices. In some instances, the selection criteria may include a selection priority for each network slice and the selection priority for a particular network slice may be based on that network slice's billing rate. In this manner, a first network slice that has a higher billing rate may be assigned a lower selection priority than a second network slice that has a lower billing rate. The network slice controller 113 may select the network slice that has the highest selection priority. In addition to selection priority, the selection criteria may include a current billing rate for the network slice, an indication of changes to the priority of the network slice, and/or an indication of changes to the billing rate of the network slice. The network slice controller 113 may receive the selection criteria from a network slice manager 128. Upon selecting a network slice, the network slice controller 113 may transmit an indication of the selected network slice to the NSSF 110. In some variations, the network slice manager 128 may be interchangeably referred to as a network slice manager function (NSMF).

The NSSF 110 may be configured to communicate with a computing resource element manager (EM) 130. For example, based on the indication of the selected network slice received from the network slice controller 113, the NSSF 110 may communicate with the computing resource EM 130 to cause the PDU session to be established for the user device 101. The NSSF 110 may transmit a network slice definition for the selected network slice to the computing resource EM 130. The computing resource EM 130 may configure computing resources based on the network slice definition. Upon successful establishment of the PDU session, the user device 101 may be provided with configuration data of the network slice 140 to enable data transmission via the network slice 140.

The computing resource EM 130 may be configured to communicate directly with the computing resources 135 and/or any other infrastructure element. The computing resource EM 230 may be configured to, based on direct communications with the physical resources, configure those physical resources and/or activate a physical resource once appropriately configured for the network slice 140. For example, the computing resource EM 130 may, based on communications from the NSSF 110, communicate with the computing resources 135 to cause configuration of one or more of the computing resources. This configuration may establish the PDU session.

Additionally, the computing resource EM 130 may be configured to communicate with a computing resource management and operation (MANO) 125. The computing resource MANO 125 may be configured to manage and orchestrate the computing resources and any other infrastructure element in connection with the network slices. For example, the computing resource MANO 125 may be configured to manage and orchestrate physical computing resources, networking resources, storage resources and virtual computing resources in connection with the network slices.

The network slice controller 113 may be configured to communication with a network slice manager 128. The network slice manager 128 may be configured to receive, from one or more servers 145 or other elements of the network infrastructure, billing rate information. The one or more servers 145 or other elements of the network infrastructure may include, for example, a billing server, other type of billing system, and one or more network functions associated with a network slice (e.g., a policy control function (PCF) of a network slice, a unified data management (UDM) of a network slice, and the like). Based on the billing rate information, the network slice manager 128 may, for each network slice, determine one or more billing rate rules and the above-mentioned selection criteria. Each of the one or more billing rate rules may associate one or more network conditions with a billing rate for a network slice. If a network slice is associated with multiple billing rate rules, each of the multiple billing rate rules will, if compared to each other, indicate a different billing rate and different network conditions. The computing resource MANO 145 may also be configured to communicate with the one or more servers 145 or other elements of the network infrastructure in connection with ensuring usage of the network slices is billed appropriately.

Additionally, the network slice manager 128 may be configured to monitor current network conditions (e.g., conditions of the network slice 140 or the overall RAN network). If the current network conditions satisfy the one or more network conditions of a billing rate rule, the network slice manager 128 may be configured to cause usage of the associated network slice to be billed according to the billing rate of the billing rate rule (e.g., cause the network slice to be configured based on the billing rate and/or transmit an indication of the billing rate for the network slice to an element of the network infrastructure responsible for billing).

As depicted in FIG. 1, one or more first computing devices 103 are illustrated as including the AMF 105, the NSSF 110, and the network slice controller 113. AMF 105, the NSSF 110 and the network slice controller 113 may each be executing on the one or more first computing devices 103 as one or more software modules. As also depicted in FIG. 1, one or more second computing devices 120 are illustrated as including the computing resource MANO 125 and the network slice manager 128. The computing resource MANO 125 and the network slice manager 128 may each be executing on the one or more second computing devices 120 as one or more software modules. The AMF 105, the NSSF 110, the computing resource MANO 125 and the computing resource EM may conform to or be configured similar to the requirements of a technical specification by the European Telecommunications Standards Institute Industry Specification Group (ETSI ISG), the $3^{rd}$ Generation Partnership Project (3GPP), or the like. For example, the computing resource MANO 125 may be an ETSI network functions virtualization (NFV) MANO, and the AMF 105 and the NSSF 110 may be configured based on 3GPP TS 23.501.

Figure 2A:
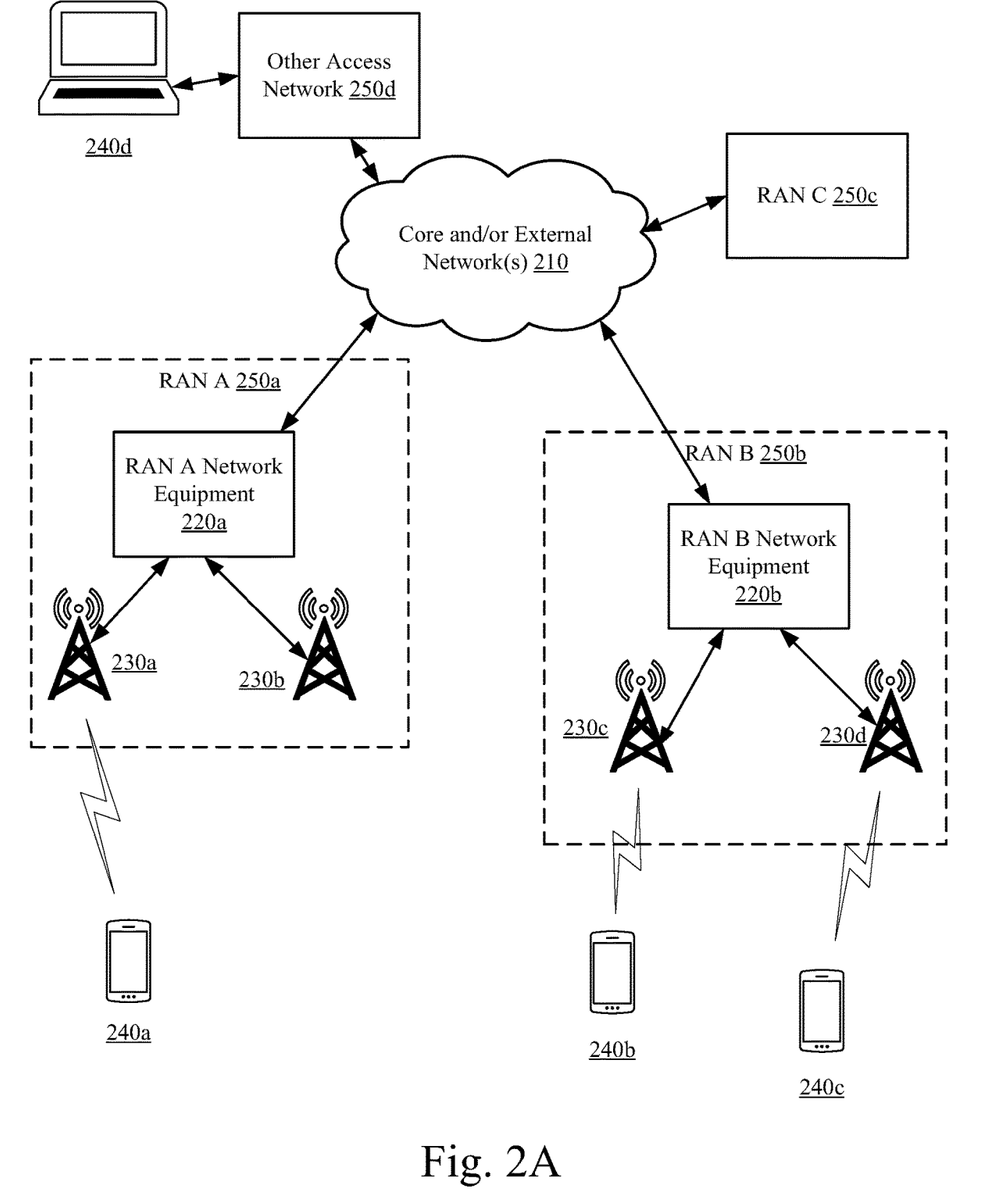
FIGS. 2A and 2B show an example network environment that may include a system for configuring a network slice.
Figure 2B:
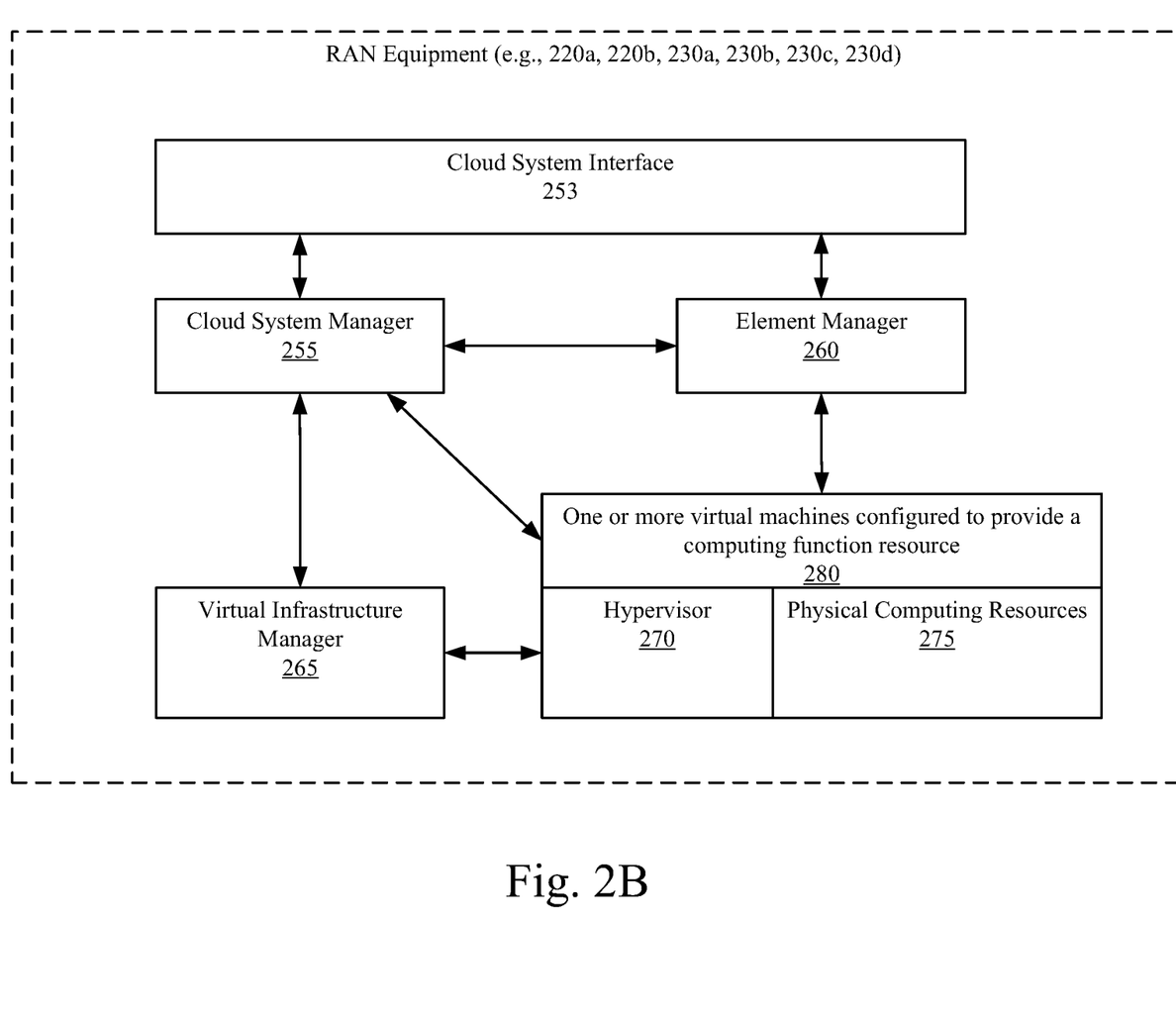

The above discussion regarding FIG. 1 provides a brief introduction to the examples and various features described throughout this disclosure. Additional details on the above aspects, as well as further aspects, will be discussed below in the remaining figures. In particular FIGS. 2A and 2B show an example operating environment that includes one or more RANs and may be suitable for use as a cellular mobile network. Although various portions of this disclosure provide details regarding an operating environment for one or more RANs or a cellular mobile network, the various aspects described herein are equally applicable to other technologies in which network slicing can be implemented.

FIGS. 2A and 2B show an example network environment that may include a system for selecting and managing a network slice. In particular, FIG. 2A illustrates a network environment including user equipment connected via one or more RANs and other networks and in which network slices may be configured. FIG. 2B illustrates example RAN equipment that may include a system for selecting and managing a network slice.

As shown in FIG. 2A, a station (STA) may connect to other STAs via one or more access networks 250 (e.g., 4G LTE access networks or 5G access networks), which in turn may be connected to each other via one or more core and/or external networks 210. After registering with the access network 250, a PDU session may be established for the STA. The PDU session may be configured to provide the STA with specific data services via one or more RANs. The data for the PDU session may be routed over the one or more RANs via a network slice.

The one or more RANs (e.g., 250a, 250b, 250c) may include various equipment such as access points 230 (e.g., 230a, 230b, 230c, 230d) and network equipment 220 (e.g., 220a, 220b). Access points 230 may be configured to communicate wirelessly with user equipment 240. The access points 230 may include base stations and/or nodes that enable wireless communications with user equipment 240 according to wireless standards (e.g., 3G, 4G, 5G, or other such wireless standards). Such nodes of the access points 230 may provide scheduler functionality, traffic management functionality, and other RAN resource management functionality. The access points 230 may include network slicing functionality, as will be discussed below in connection with FIG. 2B The network equipment 220 may be configured to provide additional RAN functionality. For example, network equipment 220 may implement radio network controller functionality for controlling an access point 230 to communicate with user equipment 240. Additionally or alternatively, the network equipment 220 may include network slicing functionality, as will be discussed below in connection with FIG. 2B. In some variations, some or all functions of the network equipment 220 may be implemented by nodes and/or base stations of the access points 230.

The STAs may include, as shown, smartphones (e.g., 240a-c) and/or personal computers (e.g., 240d) and/or any other type of user equipment. For example, user equipment may include tablets, desktop computers, laptop computers, gaming devices, virtual reality (VR) headsets, IoT devices, or any other mobile device or other fixed device having a wireless interface capable of communicating with an access point 230.

As mentioned above, the PDU session may have particular requirements and these requirements may be based on the types of data being processed and/or transmitted during the PDU session. For example, the PDU session may provide a content-related data flow that, via the network slice, is routed over the RANs and to the user equipment. The content-related data flows may include bidirectional video data flows associated with data traffic from a conversational video application (e.g., SKYPE, FACETIME, etc.) or other types of multimedia data flows that are latency-sensitive. Such latency-sensitive multimedia data flows may further include bidirectional audio (e.g., audio chat), bidirectional VR video, unidirectional audio/video/VR, and other such multimedia data flows.

The content-related data flows may be bidirectional data flows (e.g., a conversational video between user equipment 240a and user equipment 240b) and/or may involve a plurality of user equipment (e.g., a video conference involving user equipment 240a, user equipment 240b, and user equipment 240c). Such data flows involving multiple user equipment may involve multiple bidirectional data flows between each pair of user equipment (e.g., a first bidirectional data flow between user equipment 240a and user equipment 240b, and second bidirectional data flow between user equipment 240b and user equipment 240c, and a third bidirectional data flow between user equipment 240a and user equipment 240c), or may involve bidirectional data flows between each user equipment and a central server. Bidirectional data flows as described herein may thus occur between user equipment and other endpoints (e.g., servers). All of these data flows may be routed, via the network slice, over one or more of the access networks 250 and the core and/or external network(s) 210.

As illustrated in FIG. 2A, some STAs may connect via other access networks 250d that may not be a RAN. Although the concepts described below are often described with respect to a radio access network, it should be understood that the principles described herein may be used in any type of access network.

While each STA is shown as communicating with one AP 230 in FIG. 2A, the STAs may communicate with multiple APs 230 connected to the same network or multiple networks. Also, network may include additional networks that are interlinked so as to provide further internetworked communications. Such networks may include one or more private or public packet-switched networks, for example the internet, one or more private or public circuit-switched networks, for example a public switched telephone network, a satellite network, one or more wireless local area networks (e.g., 802.11 networks), one or more metropolitan area networks (e.g., 802.16 networks), and/or one or more cellular networks configured to facilitate communications to and from the STAs through one or more APs 230. In various embodiments, a STA may perform the functions of an AP for other STAs.

Orthogonal frequency division multiplexing access (OFDMA) may be used for multiplexing wireless devices for uplink and/or downlink data transmissions. In OFDMA systems, a frequency spectrum is divided into a plurality of closely spaced narrowband orthogonal subcarriers. The subcarriers are then divided into mutually exclusive groups called subbands, with each subband (also referred to as subchannels) assigned to one wireless device or multiple wireless devices. According to various aspects, subcarriers may be assigned to different wireless devices. OFDMA has been adopted in synchronous and cellular systems, including 4G broadband wireless standards (e.g. Long-Term Evolution (LTE)), 5G wireless standards (e.g., New Radio (NR)), and IEEE 802.16 family standards. Out of an abundance of caution, this discussion of OFDMA is only one example of the different types of technologies over which network slices could be configured. As one example, aspects described herein could be used to configure a network slice over an optical transport network.

As mentioned above, the access points 230 and the network equipment 220 may include network slicing functionality. FIG. 2B shows one example block diagram for providing the network slicing functionality. In particular, FIG. 2B shows a block diagram that provides network slicing functionality using virtual computing resources (e.g., virtual machines and/or containers). Thus, FIG. 3B shows a cloud system interface 253; a cloud manager 255; an element manager 260 (e.g., NOKIA NetAct); a virtual infrastructure manager 265; a hypervisor 270; and physical computing resources 275. The cloud system interface 253 may be configured similar to the one or more first computing devices 103. The cloud manager 255 may be configured similar to the one or more second computing devices 120. The element manager 260 may be configured similar to the computing resource EM 130. The virtual infrastructure manager 265, the hypervisor 270 and the physical computing resources 275 may be similar to the computing resource 135.

Based on one or more data communications routed over the one or more access networks, a network slice may be configured using the components illustrated in FIG. 2B. Indeed, as shown in FIG. 2B, one or more virtual machines 280 may be executing on the physical computing resources 275. The one or more virtual machines 280 may be configured as part of the network slice associated with a PDU session for a user device. In this manner, the one or more virtual machines 280 may be processing data that will be routed to the user device over the RAN. Thus, based on the arrangement shown in FIG. 2B, any of the access points and/or network equipment 220 may be routing, over one of the RANs, data for the PDU session via a network slice.

While the network slicing functionality of FIG. 2B is discussed as being implemented by the access point 230 or network equipment 220, other arrangements are possible. For example, the cloud system interface 253 (and/or the one or more first computing devices 103) may be located near an edge of the network (e.g., network equipment 220). The remaining components (e.g., cloud manager 255, element manager 260, virtual infrastructure manager 265, virtual machines 280, hypervisor 270, the physical computing resources 275, and/or the one or more second computing devices 120) may be located within a core network (e.g., core network 210).

Figure 3:
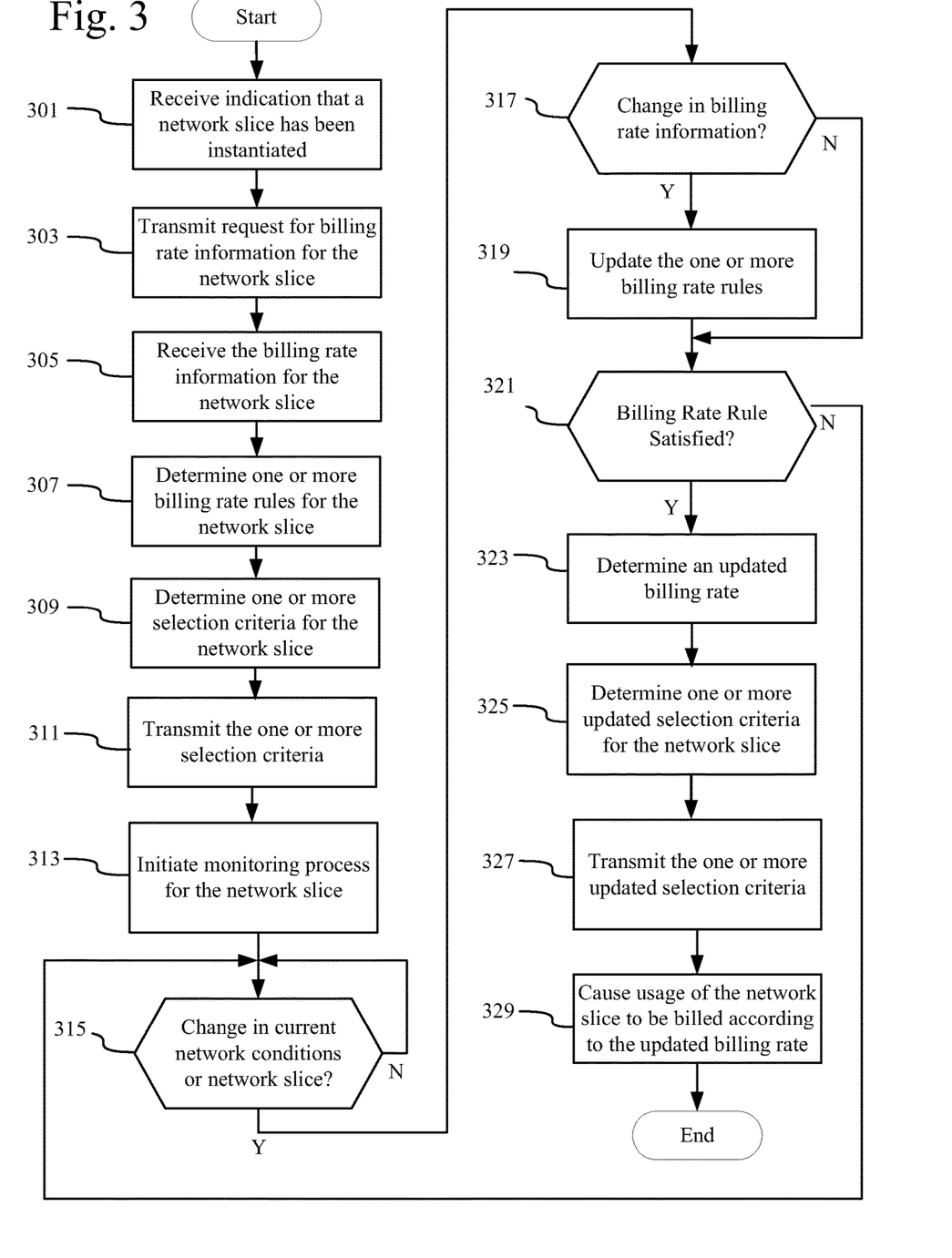
FIG. 3 shows an example method that may be performed by a network slice manager.
Figure 4:
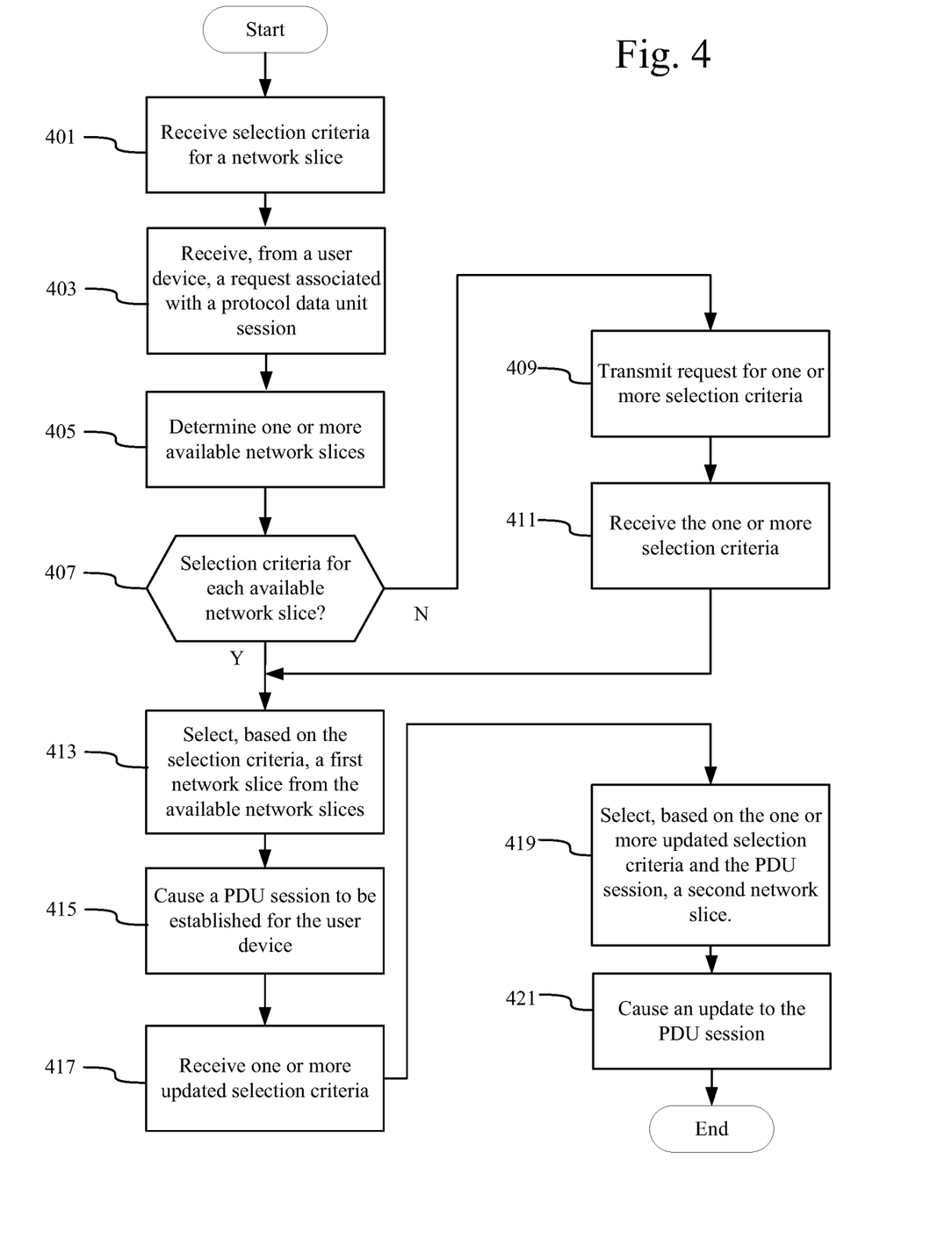
FIG. 4 shows an example method that may be performed by a network slice controller.

FIGS. 3 and 4 provide example methods that may be performed by a system for selecting and managing a network slice. The various methods may be performed by the different components and devices discussed above in connection with FIGS. 1, 2A and 2B. For example, the example method of FIG. 3 may be performed by the one or more second computing device 120. The example method of FIG. 4 may be performed by the one or more first computing devices 103. For simplicity, each of the example methods shown in FIGS. 3 and 4 will be discussed in terms of being performed by one or more computing devices. However, a specific element (e.g., AMF 105, NSSF 110, network slice controller 113, computing resource EM 130, computing resource MANO 125, network slice manager 128, and the like) may be mentioned in connection with the examples discussed throughout FIGS. 3 and 4 (e.g., if the element is a source or destination of a particular data transmission).

As mentioned above, the example method of FIG. 3 may be performed by the one or more second computing devices 120. At step 301 of FIG. 3, one or more computing devices may receive an indication that a network slice has been instantiated. This indication may have been received from a computing resource MANO or a network function of the network slice (e.g., PCF or UDM).

At step 303, the one or more computing devices may, based on receipt of the indication at step 301, transmit a request for billing rate information for the network slice. This request may be transmitted to a billing server or other billing system.

At step 305, the one or more computing devices may, based on the request transmitted at step 303, receive the billing rate information. The billing rate information may include, for example, a current billing rate for the network slice, one or more additional billing rates associated with the network slice, an indication of one or more network conditions that trigger a change in the billing rate, an indication of a return on investment for the network slice, and an indication of billing rate changes for the network slice (e.g., the billing rate has changed 10 time over the lifetime of the network slice or the billing rate has changed 3 times over a threshold amount of time). The billing information may also indicate how the each billing rate (e.g., the current billing rate and the one or more additional billing rates) are applied. For example, if the billing rate information includes a first billing rate and a second billing rate, the billing information may include an indication of one or more first network conditions that cause the first billing rate to be applied, and the billing information may include an indication of one or more second network conditions that cause the second billing rate to be applied. The network conditions indicated by the billing information could be any combination of network conditions including, for example, network load (e.g., a threshold bandwidth for the network slice or the overall network), network traffic (e.g., a threshold throughput for the network slice or the overall network), time to live (e.g., a threshold of time the network slice is active), application or service type (e.g., a particular application on the user device that is receiving the data via the network slice), a network function type (e.g., a particular network function included in the network slice) user device type (e.g., an IoT device or a mobile station being provided data via the network slice). The indication of return on investment may have been determined based on the current billing rate and a cost of executing the network slice.

At step 307, the one or more computing devices may determine, based on the billing rate information, one or more billing rate rules for the network slice. Each of the one or more billing rate rules may associate a billing rate (e.g., the current billing rate and/or the one or more additional billing rates) for the network slice with the one or more network conditions that cause the billing rate to be applied. Each billing rate rule may indicate an action to take upon the satisfaction of the billing rate rule. The action may, for example, indicate that the billing rate is to be applied upon satisfaction of the billing rate rule and may indicate one or more destination that need to be signaled to apply the billing rate (e.g., a billing server or other billing system, a network function of the network slice, and the like).

At step 309, the one or more computing devices may determine, based on the billing rate information, one or more selection criteria for the network slice. This determination may be performed based on analyzing the various billing rates of the billing information (e.g., the current billing rate and the one or more additional billing rates), analyzing the various network conditions indicated by the billing information, and/or analyzing the indication of billing rate changes for the network slice. Based on the analyses, the billing rate information may be mapped to a selection priority for the network slice. Accordingly, different sets of billing rates, network conditions and billing rate changes may cause the determination of different selection priorities. The following table provides a few examples of the relationship between a selection priority and various billing rates, network conditions and billing rate changes. The exact effect a particular example has on the selection priority may depend on the specific combination of billing rates, network conditions and billing rate changes that are used as a basis for determining the selection priority, and may further depend on any weights applied to each item in the specific combination. For example, if a first combination includes the current billing rate and the additional billing rates, an increase to the current billing rate may cause an increase in the determined selection priority, but an increase to one of the additional billing rates may not cause an increase in the determined selection priority. However, if the additional billing rates were weighted to be more important than the current billing rates, an increase to one of the additional billing rates may cause an increase in the determined selection priority.

TABLE A

| Examples | Relationships to selection priority |
|---|---|
| Value of the current billing rate | May form an indirect relationship with the selection priority. As the current billing rate increases, the selection priority may decrease. |
| Value of an additional billing rate | May form an indirect relationship with the selection priority. As the additional billing rate increases, the selection priority may decrease. |
| Value of return on investment | May form a direct relationship with the selection priority. As the additional billing rate increases, the selection priority may increase. |
| Number of additional billing rates | May form an indirect relationship with the selection priority. As the number of additional billing rates increases (e.g., from 2 additional billing rates to 4 additional billing rates), the selection priority may decrease. |
| Magnitude of a billing rate change | May form an indirect relationship with the selection priority. As the magnitude of a billing rate change increases, the selection priority may decrease. |
| Number of billing rate changes | May form an indirect relationship with the selection priority, as the number of billing rate changes increases, the selection priority may decrease. |
| Amount of network load | May form an indirect relationship with the selection priority. As the amount of network load increases, the selection priority may decrease. |
| Amount of network traffic | May form an indirect relationship with the selection priority. As the amount of network traffic increases, the selection priority may decrease. |
| Amount of time to live | May form an indirect relationship with the selection priority. As the amount of time to live increases, the selection priority may decrease. |
| Application or service type | May form an implementation specific relationship. Specific application or service types may cause the selection priority to increase or decrease. |
| Network function type | May form an implementation specific relationship. Specific network function types may cause the selection priority to increase or decrease. |
| User device type | May form an implementation specific relationship. Specific user device types may cause the selection priority to increase or decrease. |

In addition to priority, the one or more selection criteria may include additional information. For example, the one or more selection criteria may include the current billing rate, the indication of return on investment, the indication of billing rate changes for the network slice, and/or an indication of selection priority changes for the network slice. The indication of selection priority changes for the network slice will be discussed below in connection with step 319.

At step 311, the one or more computing devices may transmit the one or more selection criteria. This transmission may be to the network slice controller (e.g., network slice controller 113) or a device configured as the network slice controller (e.g., the one or more computing devices 103). In some instances, this transmission may be performed automatically based on the network slice being instantiated (discussed below in connection with step 401 of FIG. 4). Additionally, in some instances, the one or more computing devices may perform or repeat this transmission based on a request by the network slice controller (discussed below in connection with step 407 of FIG. 4).

At step 313, the one or more computing devices may initiate a monitoring process for the network slice. The monitoring process may be configured based on the billing rate rules. For example, the monitoring process may monitor network conditions of the network slice and/or the overall network, determine whether a billing rate rule is satisfied and, if the billing rate rule is satisfied, take the appropriate action associated with the billing rate rule. Steps 315-329 provide an example of a monitoring process. Additionally, the monitoring process may be performed during the lifetime of the network slice. Accordingly, steps 315-319 may be repeated numerous times throughout the lifetime of the network slice. In some variations, the monitoring process (e.g., steps 315-329) may be performed in its own thread that is periodically or continually executed.

At step 315, the one or more computing devices may determine whether there has been a change in current network conditions or a change in the network slice. For example, the monitoring process may be configured to monitor one or more network conditions associated with the billing rate rules for the network slice and/or to monitor for configuration changes in the network slice. As one particular example, if a billing rate rule associates a billing rate with network throughput of the network slice, the network throughput of the network slice will be monitored. If at least one of the network conditions has changed, the method may proceed to step 317. If there has been no change to the network conditions, the method may continue to monitor for changes in network conditions by repeating step 315.

As another particular example, the monitoring process may monitor for indications of configuration changes from the network slice or an element associated with the network slice (e.g., a PCF or UDP of the network slice). Based on receiving an indication that configuration of the network slice has changed (e.g., an indication that a network function has been activated or deactivated for the network slice), the method may proceed to step 317. If no indication of a configuration change has been received, the method may continue to monitor for changes in network conditions by repeating step 315.

At step 317, the one or more computing devices may determine whether there has been a change in billing information. For example, the monitoring process may be configured to monitor for an indication that the billing rate information has changed. If this indication has been received, the method may proceed to step 319. If there has been no change in the billing information, the method may proceed to step 321.

At step 319, the one or more computing devices may, based on the change in the network slice, update the one or more billing rate rules. For example, the one or more computing devices, similar to steps 303 and 305, may request and receive an update to the billing rate information from a billing server. Based on the update to the billing rate information, the one or more billing rate rules may be updated by, for example, performing a determination similar to step 307, which involved the initial determination of the billing rate rules for the network slice.

At step 321, the one or more computing devices may determine whether a billing rate rule is satisfied. This determination may be performed by comparing one or more current network conditions to the one or more network conditions of the billing rate rules. Based on the comparison, one of the billing rate rules may be satisfied. For example, assume the billing rate rules includes a first billing rate rule that associates a first billing rate to a first threshold of network throughput for the network slice, and further includes a second billing rate rule that associates a second billing rate to a second threshold of network throughput for the network slice. The first threshold of network throughput may be greater than the second threshold of network throughput. However, the current network throughput of the network slice may be greater than both the first threshold and the second threshold. In this instance, the second billing rate rule would be satisfied based the second threshold being greater than the first threshold. As another example, assume the billing rate rules includes a first billing rate rule that associates a first billing rate to a particular network function. Based on activation of the network function, the first billing rate rule may be satisfied. If a billing rate rule is satisfied, the method may proceed to step 323. If none of the billing rate rules are satisfied, the method may proceed back to step 315 to resume monitoring for changes in network conditions and changes in the network slice.

At step 323, the one or more computing devices may determine an updated billing rate. This updated billing rate may be the billing rate of the billing rate rule that was satisfied at step 319. The updated billing rate may be different from the current billing rate for the network slice.

At step 325, the one or more computing devices may determine, based on the updated billing rate, one or more updated selection criteria for the network slice. For example, the one or more computing devices may determine the one or more updated selection criteria by performing a determination similar to step 309, which involved the initial determination of the one or more selection criteria for the network slice. Determining the updated selection criteria may result in a different selection priority being determined for the network slice. Additionally, the one or more computing devices may store an indication of a change in the selection priority (e.g., as part of the above-mentioned indication of selection priority changes for the network slice).

At step 327, the one or more computing devices may transmit the one or more updated selection criteria. This transmission may be to the network slice controller (e.g., network slice controller 113) or a device configured as the network slice controller (e.g., the one or more computing devices 103). This transmission may be performed similar to step 311 (e.g., automatically based on the update being determined or based on a request by the network slice controller).

At step 329, the one or more computing devices may cause usage of the network slice to be billed according to the updated billing rate. This may include, for example, transmitting an indication of the updated billing rate to each destination that needs to be signaled to apply the billing rate (e.g., a billing server, PCF, and the like). Additionally, the one or more computing devices may store an indication of the change in billing rate from the original billing rate to the updated billing rate (e.g., as part of the above-mentioned indication of billing rate changes for the network slice.

As mentioned above, the example method of FIG. 4 may be performed by the one or more first computing devices 103. At step 401 of FIG. 4, one or more computing devices may receive one or more selection criteria for a network slice. The one or more selection criteria may have been transmitted by a network slice manager (network slice manager 128) or a computing device configured as the network slice manager (one or more second computing devices 120). Further, the transmission may have been based on instantiation of the network slice (e.g., step 311 of FIG. 3). Once instantiated, a network slice may be considered as being available for activation and/or selection. The one or more computing devices may store the one or more selection criteria in a database.

At step 403, the one or more computing devices may receive, from a user device, a request associated with a PDU session. Further, the request may take the form of a PDU session request or a registration request. In some variations, the request may include an indication of a network slice type, an indication of a network slice differentiator and an indication of a data network name. The indication of a network slice type may, for example, be one from a standardized list of network slice types. For TS 23.501, a standardized network slice type is defined for enhanced Mobile Broadband (eMBB), ultra-reliable low latency communications (URLLC), and massive internet of things (MIoT) communications. A network slice differentiator may be optional information that provides further indications of the requirements for the PDU session or the characteristics of a satisfactory network slice. The data network name may be, for example, a Public Land Mobile Network identifier (PLMN-ID), which includes a mobile country code (MCC) and a mobile network code (MNC). Additionally, each network slice type may be paired with a network slice differentiator within a Single Network Slice Selection Assistance Information (S-NSSAI). The request may include one or more S-NSSAI, with each being for a different network slice. Currently, 3GPP supports up to eight S-NSSAI for a particular user device. Thus, under current 3GPP support, a single user device can be served by up to eight network slices. The S-NSSAIs may be received over multiple requests. For simplicity, the following steps will be discussed in terms of a single network slice type and network slice differentiator. Steps 405-415 may be repeated for each pair of network slice type and network slice differentiators.

At step 405, the one or more computing devices may, based on the request, determine one or more available network slices that satisfy the request. For example, a network slice type, a network slice differentiator, and a data network name may be compared to an inventory of instantiated network slices to determine which network slices satisfy the requirements of the PDU session. For example, if the network slice type indicates eMBB, the inventory of instantiated network slices may be searched for those that are capable of supporting eMBB. Any network slice that satisfies all requirements specified by the network slice type, the network slice differentiator, and the data network name may be added as one of the one or more available network slices. If a particular network slice fails to satisfy one of the requirements, it may not be added as one of the one or more available network slices.

At step 407, the one or more computing devices may determine whether selection criteria for each of the one or more available network slices has been received. This determination may be performed by searching the database based on the one or more available network slices to determine whether the database stores selection criteria for each available network slice. If a slice listed in the inventory is not associated with at least one selection criterion stored by the database, the one or more computing devices may determine that the selection criteria has not been received for each available network slice. Accordingly, the method may proceed to step 409. Otherwise, the selection criteria has been received for each available network slice and the method may proceed to step 413.

At step 409, the one or more computing devices may transmit, based on determining that selection criteria has not been received, a request for one or more selection criteria. This request may be transmitted to the network slice manager (network slice manager 128) or the computing device configured as the network slice manager (one or more second computing devices 120). Additionally, the request may identify any network slice for which the selection criteria is missing from the database.

At step 411, the one or more computing devices may receive, based on the request of step 409, the one or more selection criteria. The received selection criteria may be for each network slice identified by the request transmitted at step 409. Upon receipt, the one or more selection criteria may be stored in the database.

At step 413, the one or more computing devices may select, based on the one or more selection criteria for the one or more available network slices, a first network slice from the one or more available network slices. For example, if the one or more selection criteria includes a selection priority, this selection may be performed by determining which of the one or more available network slices has the highest selection priority and selecting the network slice with the highest selection priority. As another example, if the one or more selection criteria includes additional information, this selection may be performed based on additional heuristics. For example, if the one or more selection criteria includes the current billing rate, this selection may be performed by determining which available network slice has the highest selection priority and which available network slice has the lowest current billing rate. The current billing rate of the available network slice with the highest selection priority may be compared to the lowest billing rate. The selection priority of the available network slice with the lowest billing rate may be compared with the highest selection priority. The selection may be based on the two comparisons. As one particular example, the differences between the two selection priorities and the two billing rates may be computed, the differences may be normalized to a common scale, and one of the two available network slices may be selected based on the magnitude of the normalized differences (e.g., select the available network slice with the highest priority if the normalized difference between the priorities is greater than the normalized difference of the current billing rates). Similar heuristics could be performed for other combinations of selection priorities and the additional information of the selection criteria (e.g., the current billing rates, the indication of return on investment, the indication of billing rate changes for the network slice, and/or an indication of selection priority changes for the network slice). As an example of the similar heuristics that are possible for another combination of selection priorities and the additional information of the selection criteria, the indications of return on investment for the network slices having the two highest selection priorities could be compared to each other. Based on this comparison, the network slice with the highest return on investment could be selected.

At step 415, the one or more computing devices may cause a PDU session to be established for the user device. Causing the PDU session to be stablished may include transmitting, to a computing resource EM, a definition of the first network slice and an indication of the PDU session. Upon receipt, the computing resource EM may map the definition of the first network slice to one or more network functions and configure the network functions to operate as the first network slice. Upon successful configuration of the network functions, configuration data for the first network slice and the PDU session may be transmitted to the user device. Upon receipt, the user device may be able to transmit and receive data for the PDU session via the first network slice.

At step 417, the one or more computing devices may, at some point in time during the lifetime of the first network slice, receive one or more updated selection criteria. The one or more updated selection criteria may have been transmitted by the network slice manager (network slice manager 128) or the computing device configured as the network slice manager (one or more second computing devices 120). Additionally, the one or more updated selection criteria may be for the first network device or another network slice from the one or more available network slices (e.g., a second network slice from the one or more available network slices). Further, the one or more updated selection criteria may, as compared to the corresponding selection criteria processed at step 413, have at least one value that is different from the previously stored selection criteria (e.g., a different value for the selection priority or different information included as part of the additional information). The one or more updated selection criteria may be stored in the database.

At step 419, the one or more computing devices may select, based on the one or more updated selection criteria and the PDU session, a second network slice. For simplicity, this discussion will assume the one or more updated selection criteria is for the first network slice and that the selection priority has changed in the updated selection criteria. To perform this selection, the one or more computing devices may determine that the updated selection criteria is for the first network slice. The one or more computing devices may further determine that the first network slice is associated with the PDU session. Based on the PDU session, the one or more computing devices may determine an updated set of available network slices that satisfy the requirements of the PDU session. For purposes of this example, the updated set of available network slices includes a second network slice. Upon determining the updated set of available network slices, the one or more computing devices may perform determinations, comparisons and heuristics similar to those discussed in connection with step 413 reselect a network slice that will be associated with the PDU session for the user device. In this example, the selection has resulted in a change from the first network slice to the second network slice. This change may be based on the change that occurred in the updated selection criteria (e.g., the change in selection priority caused the second network slice to have a higher priority than the first network slice).

At step 421, the one or more computing devices may, based on selection of the second network slice, cause an update to the PDU session. Causing the update to the PDU session may include transmitting, to a computing resource EM, a definition of the second network slice and an indication of the PDU session. Upon receipt, the computing resource EM may map the definition of the second network slice to one or more network functions and configure the network functions to operate as the second network slice. Upon successful configuration of the network functions, configuration data for the second network slice and the PDU session may be transmitted to the user device. Upon receipt, the user device may be able to transmit and receive data for the PDU session via the second network slice. A definition of a network slice may be formatted according to or based on a version of ETSI Network Service Description (NSD), other industry-standard data model definition, or proprietary data model definition.

Figure 5:
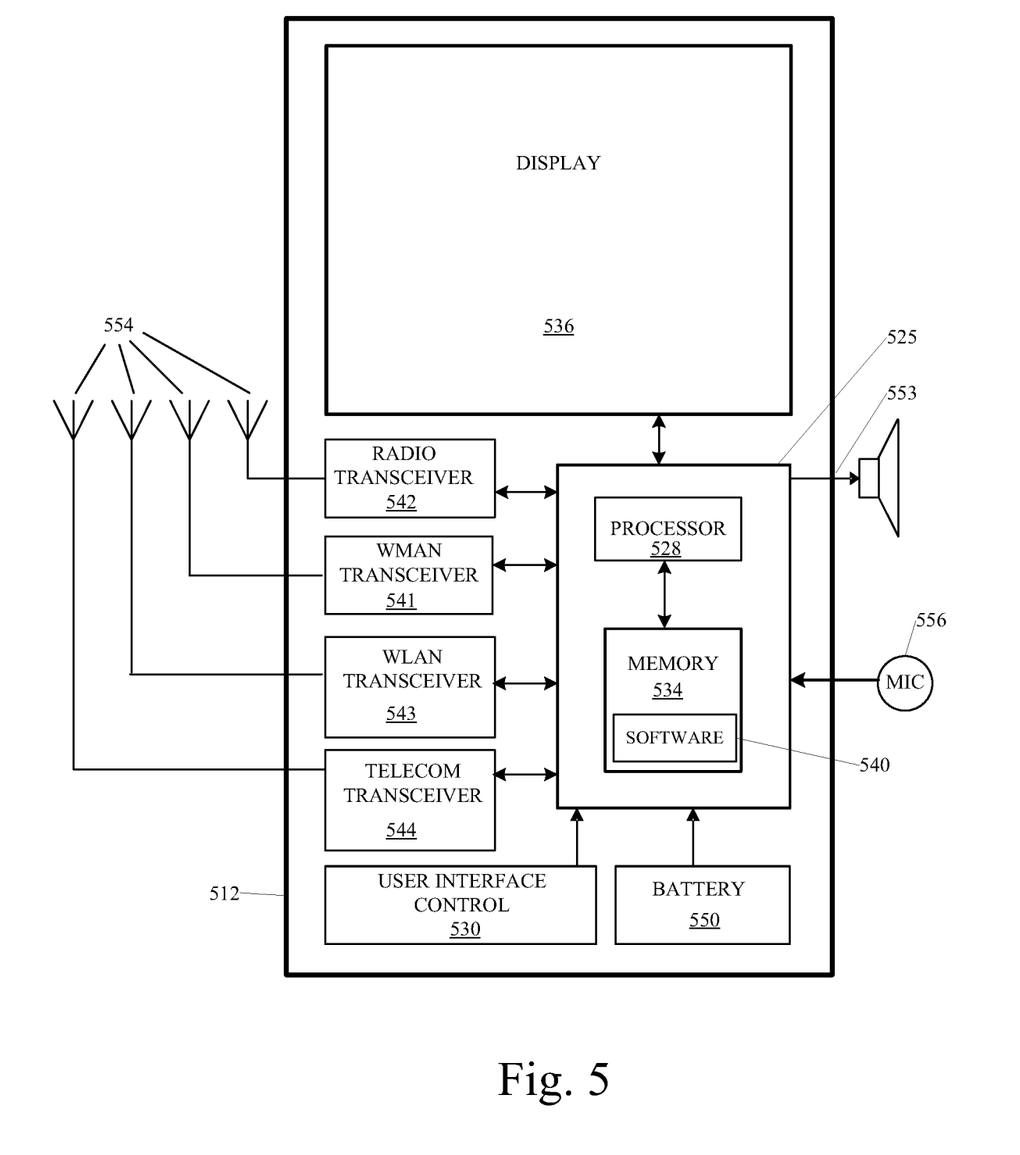
FIG. 5 shows an example apparatus that may be used in a network environment described herein or used to implement one or more aspects described herein.

Any of the method steps, operations, procedures or functions described herein may be implemented using one or more processors and/or one or more memory in combination with machine executable instructions that cause the processors and other components to perform various method steps, described features, or other aspect described herein. FIG. 5 shows an example apparatus, in particular a computing device 512, that may be used in a network environment such as those found in FIGS. 1, 2A and 2B. The computing device 512 may be configured to perform some or all of the functions of any device, station, equipment, points, or the like, found in FIGS. 1, 2A and 2B. Further, the computing device 512 may be configured to perform some or all of the steps discussed in connection with FIGS. 3 and 4. The computing device 512 may be configured to perform any other process, feature or aspect discussed in connection with FIGS. 1-4, or any variation thereof.

The computing device 512 shows just one example of the various types of hardware components that may be present in an apparatus that is configured to implement one or more aspects described in this disclosure. Computing device 512 may include a controller 525. The controller 525 may be connected to a user interface control 530, display 536 and/or other elements as illustrated. Controller 525 may include circuitry, such as for example one or more processors 528 and one or more memory 534 storing software 540. The software 540 may comprise, for example, one or more of the following software options: client software 565, user interface software, server software, etc.

Device 512 may also include a battery 550 or other power supply device, speaker 553, and one or more antennae 554. Device 512 may include user interface circuitry, such as user interface control 530. User interface control 530 may include controllers or adapters, and other circuitry, configured to receive input from or provide output to a keypad, touch screen, voice interface—for example via microphone 556, function keys, joystick, data glove, mouse and the like. The user interface circuitry and user interface software may be configured to facilitate user control of at least some functions of device 512 though use of a display 536. Display 536 may be configured to display at least a portion of a user interface of device 512. Additionally, the display may be configured to facilitate user control of at least some functions of the device (for example, display 536 could be a touch screen).

Software 540 may be stored within memory 534 to provide instructions to processor 528 such that when the instructions are executed, processor 528, device 512 and/or other components of device 512 are caused to perform various processes or methods, such as those described herein. The software may comprise machine executable instructions and data used by processor 528 and other components of computing device 512 may be stored in a storage facility such as memory 534 and/or in hardware logic in an integrated circuit, ASIC, etc. Software may include both applications and operating system software, and may include code segments, instructions, applets, precompiled code, compiled code, computer programs, program modules, engines, program logic, and combinations thereof.

Memory 534 may include any of various types of tangible machine-readable storage medium, including one or more of the following types of storage devices: read only memory (ROM) modules, random access memory (RANI) modules, magnetic tape, magnetic discs (for example, a fixed hard disk drive or a removable floppy disk), optical disk (for example, a CD-ROM disc, a CD-RW disc, a DVD disc), flash memory, and EEPROM memory. As used herein (including the claims), a tangible or non-transitory machine-readable storage medium is a physical structure that may be touched by a human. A signal would not by itself constitute a tangible or non-transitory machine-readable storage medium, although other embodiments may include signals or ephemeral versions of instructions executable by one or more processors to carry out one or more of the operations described herein.

As used herein, processor 528 (and any other processor or computer described herein) may include any of various types of processors whether used alone or in combination with executable instructions stored in a memory or other computer-readable storage medium. Processors should be understood to encompass any of various types of computing structures including, but not limited to, one or more microprocessors, special-purpose computer chips, field-programmable gate arrays (FPGAs), controllers, application-specific integrated circuits (ASICs), combinations of hardware/firmware/software, or other special or general-purpose processing circuitry.

As used in this application, the term 'circuitry' may refer to any of the following: (a) hardware-only circuit implementations (such as implementations in only analog and/or digital circuitry) and (b) combinations of hardware circuits and software (and/or firmware), such as (as applicable): (i) a combination of processor(s) or (ii) portions of processor(s)/software (including digital signal processor(s)), software, and memory(ies) that work together to cause an apparatus, such as a mobile phone or server, to perform various functions) and (c) hardware circuits, such as a microprocessor(s) or a portion of a microprocessor(s), that require software or firmware for operation, even if the software or firmware is not physically present.

These examples of 'circuitry' apply to all uses of this term in this application, including in any claims. As an example, as used in this application, the term "circuitry" would also cover an implementation of merely a processor (or multiple processors) or portion of a processor and its (or their) accompanying software and/or firmware. The term "circuitry" would also cover, for example, a baseband integrated circuit or applications processor integrated circuit for a mobile phone or a similar integrated circuit in a server, a cellular network device, or other network device.

Device 512 or its various components may be mobile and be configured to receive, decode and process various types of transmissions including transmissions in Wi-Fi networks according to a wireless local area network (e.g., the IEEE 802.11 WLAN standards 802.11n, 802.11ac, etc.) and/or wireless metro area network (WMAN) standards (e.g., 802.16), through a specific one or more WLAN transceivers 543, one or more WMAN transceivers 541. Additionally or alternatively, device 512 may be configured to receive, decode and process transmissions through various other transceivers, such as FM/AM Radio transceiver 542, and telecommunications transceiver 544 (e.g., cellular network receiver such as CDMA, GSM, 4G LTE, 5G, etc.).

Although the above description of FIG. 5 generally relates to a mobile device, other devices or systems may include the same or similar components and perform the same or similar functions and methods. For example, a computer communicating over a wired network connection (for example, device 240*d* of FIG. 2A) may include the components or a subset of the components described above, and may be configured to perform the same or similar functions as device 512 and its components. Further access points as described herein may include the components, a subset of the components, or a multiple of the components (e.g., integrated in one or more servers) configured to perform the steps, described herein.

Although specific examples of carrying out the invention have been described, there are numerous variations and permutations of the above-described systems and methods that are contained within the spirit and scope of the invention as set forth in the appended claims.

We claim:
1. A method comprising:
  receiving, from a user device, a protocol data unit session request;
  receiving, by one or more computing devices, for a first network slice of a plurality of available network slices, one or more selection criteria that is based on billing rate information associated with the first network slice;
  selecting, by the one or more computing devices, based on the one or more selection criteria, the first network slice; and
  causing, by the one or more computing devices, a protocol data unit session to be established for the user device, wherein the protocol data unit session is associated with the first network slice.

2. The method of claim 1, wherein the one or more selection criteria comprises a first selection priority that is based on a current billing rate of the first network slice, wherein the selecting is performed based on comparing the first selection priority to a second selection priority, and wherein the second selection priority is associated with a second network slice of the plurality of available network slices.

3. The method of claim 1, wherein the one or more selection criteria comprises a first indication of billing rate changes for the first network slice, wherein the selecting is performed based on comparing the first indication of billing rate changes to a second indication of billing rate changes for a second network slice, and wherein the second network slice is of the plurality of available network slices.

4. The method of claim 1, wherein the one or more selection criteria comprises a current billing rate for the first network slice, wherein the selecting is performed based on comparing the current billing rate to a billing rate threshold associated with the user device.

5. The method of claim 1, further comprising:
  determining, based an updated billing rate for the first network slice, one or more updated selection criteria;
  receiving, by the one or more computing devices, the one or more updated selection criteria;
  selecting, by the one or more computing devices, based on the one or more updated selection criteria, a second network slice of the plurality of available network slices;
  causing, by the one or more computing devices, an update to the protocol data unit session, wherein, after the update, the protocol data unit session is associated with the second network slice; and
  routing, via the second network slice, second data associated with the protocol data unit session.

6. The method of claim 1, further comprising:
  determining a first billing rate rule for the first network slice, wherein the first billing rate rule associates one or more network conditions with a billing rate;
  determining, based on comparing one or more current network conditions to the one or more network conditions, that the first billing rate rule is satisfied; and
  causing usage of the first network slice to be billed according to the billing rate.

7. The method of claim 6, wherein determining the first billing rate rule is performed based on an instantiation of the first network slice or a change to a network function associated with the first network slice.

8. An apparatus comprising:
one or more processors; and
at least one non-transitory memory storing executable instructions that, when executed by the one or more processors, cause the apparatus to at least:
receive, from a user device, a protocol data unit session request;
receive, for a first network slice of a plurality of available network slices, one or more selection criteria that is based on billing rate information associated with the first network slice;
select, based on the one or more selection criteria, the first network slice; and
cause a protocol data unit session to be established for the user device, wherein the protocol data unit session is associated with the first network slice.

9. The apparatus of claim 8, wherein the one or more selection criteria comprises a first selection priority that is based on a current billing rate of the first network slice, wherein causing the apparatus to select the first network slice is performed based on comparing the first selection priority to a second selection priority, and wherein the second selection priority is associated with a second network slice of the plurality of available network slices.

10. The apparatus of claim 8, wherein the one or more selection criteria comprises a first indication of billing rate changes for the first network slice, wherein causing the apparatus to select the first network slice is performed based on comparing the first indication of billing rate changes to a second indication of billing rate changes for a second network slice, and wherein the second network slice is of the plurality of available network slices.

11. The apparatus of claim 8, wherein the one or more selection criteria comprises a current billing rate for the first network slice, wherein causing the apparatus to select the first network slice is performed based on comparing the current billing rate to a billing rate threshold associated with the user device.

12. The apparatus of claim 8, wherein the executable instructions, when executed by the one or more processors, cause the apparatus to:
receive one or more updated selection criteria;
select, based on the one or more updated selection criteria, a second network slice of the plurality of available network slices; and
cause an update to the protocol data unit session, wherein, after the update, the protocol data unit session is associated with the second network slice.

13. The apparatus of claim 12, wherein the one or more updated selection criteria is determined based on a monitoring process for the first network slice determining that a billing rate rule is satisfied, wherein determining that the billing rate rule is satisfied is performed based on comparing one or more current network conditions to one or more network conditions of the billing rate rule.

* * * * *